United States Patent

Rubin

[19]

[11] Patent Number: 6,131,186
[45] Date of Patent: *Oct. 10, 2000

[54] METHOD AND APPARATUS FOR ISOLATING PORTIONS OF MULTI-TASKING COMPUTER SOFTWARE

[75] Inventor: Harvey Rubin, Morristown, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/063,197

[22] Filed: Apr. 20, 1998

[51] Int. Cl.$^7$ ...................................................... G06F 9/45
[52] U.S. Cl. ................................................................ 717/4
[58] Field of Search .................................. 395/704, 705, 395/680; 717/4; 703/22

[56] References Cited

U.S. PATENT DOCUMENTS

| | | | |
|---|---|---|---|
| 5,519,848 | 5/1996 | Wloka et al. | 395/500 |
| 5,541,862 | 7/1996 | Bright et al. | 702/122 |
| 5,604,896 | 2/1997 | Duxbury et al. | 395/500 |
| 5,630,101 | 5/1997 | Sieffert | 395/500 |
| 5,799,142 | 8/1998 | Toyoda | 395/183.14 |
| 5,805,892 | 9/1998 | Nakajima | 395/704 |
| 5,832,299 | 11/1998 | Wooten | 395/829 |
| 5,996,016 | 11/1999 | Thalheimer et al. | 709/227 |
| 6,006,278 | 12/1999 | Cottrill | 709/300 |
| 6,058,425 | 5/2000 | White | 709/227 |

OTHER PUBLICATIONS

Fang et al. A real–time RTL engineering–change method supporting on–line debugging for logic–emulation applications. ACM, Jun. 1997.

Bannatyne. Debugging aids for systems–on–a–chip. IEEE. pp. 107–111, Feb. 1998.

Patience. Redirecting system calls in Mach 3.0: an alternative to the emulator. Proceedings of the USENIX Mach III Symposium. Abstract, Apr. 1993.

*Primary Examiner*—Tariq R. Hafiz
*Assistant Examiner*—Wei Zhen
*Attorney, Agent, or Firm*—DeMont & Breyer, LLC

[57] ABSTRACT

A method and apparatus for isolating portions of multi-tasking software for integration testing (debugging) are disclosed. One or more applications software tasks can advantageously be isolated for testing from other "remote" tasks in the same subsystem or other subsystems, or one or more complete computer subsystems having multi-tasking software can be isolated from other "remote" subsystems having other multi-tasking software. Such isolation facilitates debugging without having to modify the application software. In accordance with illustrated embodiments of the invention, tasks or complete subsystems are isolated using a test task and an external user. The test task is operable to alter communications pathways for the transfer of messages between tasks that are supported by a common communications mechanism that is resident in multi-tasking computer systems. The external user is operable to emulate the functions of the remote software tasks. A message from a task being tested that is intended for a remote task in the same or a different subsystem is rerouted to the test task and then to the external user. The external user emulates the functions of the remote task, generates a response message, and delivers the response message, via the test task, to an appropriate task under test. Thus, without any modification to the software tasks, such tasks can be debugged for integration with other tasks in the system. As such, the final production software is identical to the debugged software.

18 Claims, 3 Drawing Sheets

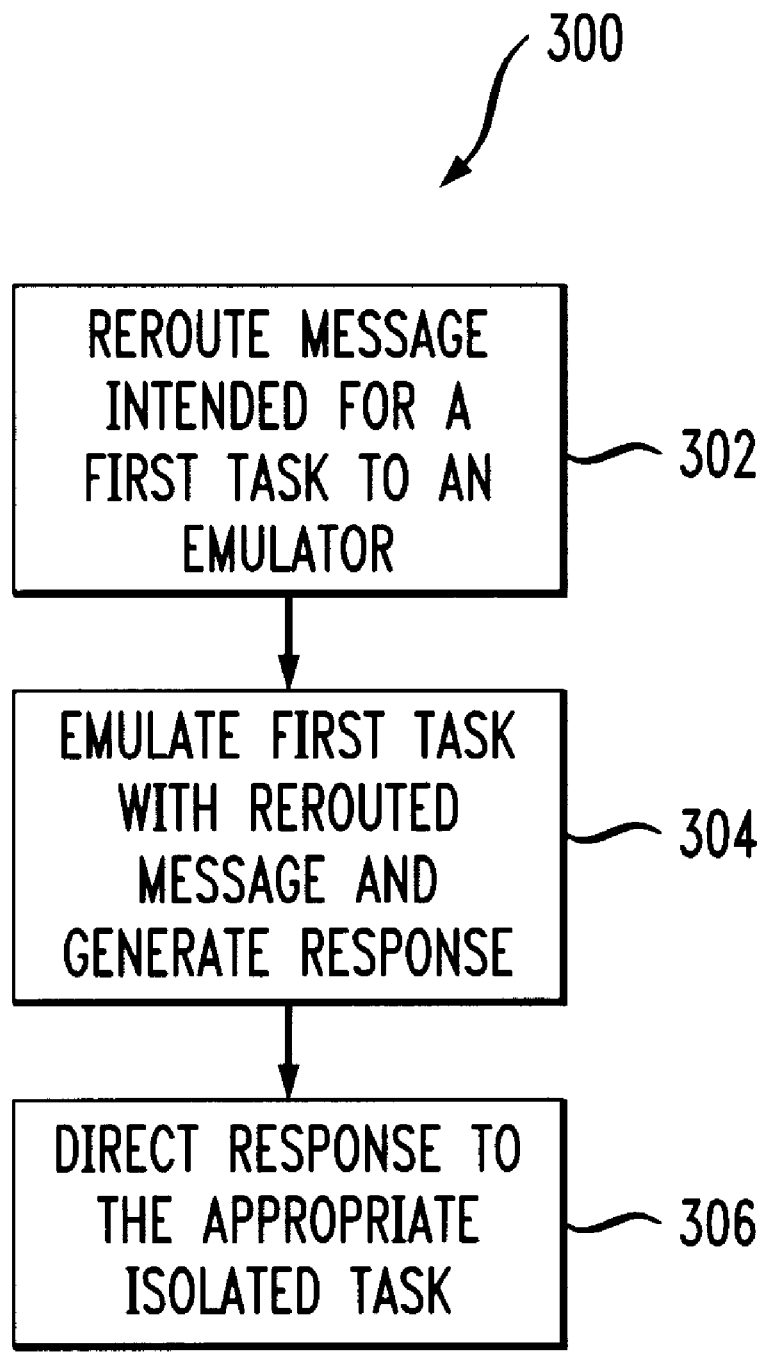

METHOD AND APPARATUS FOR ISOLATING PORTIONS OF MULTI-TASKING COMPUTER SOFTWARE

FIELD OF THE INVENTION

The present invention relates generally to multi-tasking computer systems, and, more specifically, to a method and apparatus for debugging applications software running on such systems.

BACKGROUND OF THE INVENTION

Real time computer systems often organize application software as a set of separately-scheduled entities called "tasks." Each such task performs a specific function, or set of functions. When a "multi-tasking" computer system receives an input requiring that such a function be performed, computer software schedules for execution a task that performs the required function. The scheduling software is commonly referred to as a "real-time executive" or a "real-time operating system."

The interactions in real-time computer systems may be quite complex. For example, in the course of performing the processing required for a given input, one software task may create an input to another "local" software task functionality, which must be scheduled and executed before the original processing need can be fulfilled. Moreover, as a further complication, such computer systems often consist of several different computer subsystems that are connected together via some communications mechanism. Each of such subsystems may be multi-tasking. The tasks in each of such subsystems interact among themselves (local) as well as with the tasks in the other multi-tasking subsystems.

Multi-tasking application software is usually produced in "piece-meal" fashion. In other words, a software developer typically designs, develops and tests one or more but not all of the software tasks required in a given computer subsystem. To do so, unique software tools are created that emulate the other software tasks in the subsystem (for which the developer is not responsible). At some point, all the application software in a given computer subsystem must be tested as a whole, wherein other interacting software from other interacting subsystems are emulated. To accomplish this, the software being tested is modified by incorporating conditionally-compiled coding statements, such as printing or message sending instructions. Such an approach disadvantageously tests application software that is different from the software that will ultimately be running on the final production version of the computer system. Some software problems may therefore not be detected until the production version is running.

The art would thus benefit from a method and apparatus for testing or debugging application software in multi-tasking systems that does not alter the software being debugged.

SUMMARY OF THE INVENTION

A method and apparatus for isolating portions of multi-tasking software for integration testing (debugging) are disclosed. According to the present teachings, one or more applications software tasks being tested are advantageously "isolated" from other tasks not being tested ("remote tasks") running on the same subsystem, or tasks in one or more subsystems are isolated from tasks running on other subsystems ("remote subsystems"), without modifying any of the tasks. As used herein, the term "isolated or isolating" means preventing a task being tested ("local tasks") from receiving messages (i.e., information bearing signals) from, or sending messages to, a remote task.

In one embodiment, one computer subsystem of a multi-tasking computer system comprising at least two computer subsystems each having multi-tasking software is isolated using a test task and an external user (e.g., a human using a terminal interface, a script generation software program running on a processor external to the computer subsystem(s) being tested, etc.). The test task is operable to alter communications pathways by which messages are transferred between tasks, which pathways are supported by a common communications mechanism that is resident in multi-tasking computer systems. The external user is operable to emulate the functions of the remote tasks.

In an illustrative method (for isolating tasks in a subsystem from tasks in other subsystems), the external user first requests that the test task interact with the common communications mechanism to reroute messages to the test task that are intended for tasks on remote subsystems. The external user then sends a stimulus message to the isolated ("local") subsystem. The stimulus message is directed to a first local task having a functionality appropriate for processing the message. In the course of such processing, the first local task may provide another message to other tasks within the isolated subsystem. During processing, the first task, or one or more of such other local tasks, may generate messages for a task or tasks located in remote subsystems. In accordance with the present teachings, such messages are advantageously rerouted to the test task, which then sends such messages to the external user. The external user processes the received messages by emulating the functionality of the appropriate tasks in such remote subsystems. Response messages are generated, and then sent from the external user to the test task. The test task directs such response messages to the appropriate tasks in the local subsystem. The tasks then complete processing and a response to the original stimulus message is direct therefrom to the external user via the test task.

Thus, in contrast to conventional practice for debugging multi-tasking software, wherein the software being tested requires modification, the present invention advantageously provides a way to isolate software for debugging such that the debugged software is the same software that runs in a final production system. As such, there is expected to be fewer undiscovered problems with the final production software.

BRIEF DESCRIPTION OF THE DRAWINGS

FIG. 3 depicts a method for isolating software in accordance with an illustrative embodiment of the present invention.

DETAILED DESCRIPTION

For the purposes of the present specification, a "multi-tasking computer system" refers to a computer system that organizes application software as separately-scheduled entities capable of performing a specific function or functions. Such entities are referred to herein as "software tasks" or simply "tasks." In response to a system input requiring that some function be performed, a "real-time executive" or "real-time operating system" schedules a task appropriate for accomplishing the function. In some embodiment, a multi-tasking computer system comprises a single processor in which intra-processor communication occurs between tasks. In other embodiments, a multi-tasking computer system comprises two or more processors each running multi-tasking software comprising tasks engaging in intra- and inter-processor communications. Each of such processors is also referred to herein as a "subsystem."

Figure 1:
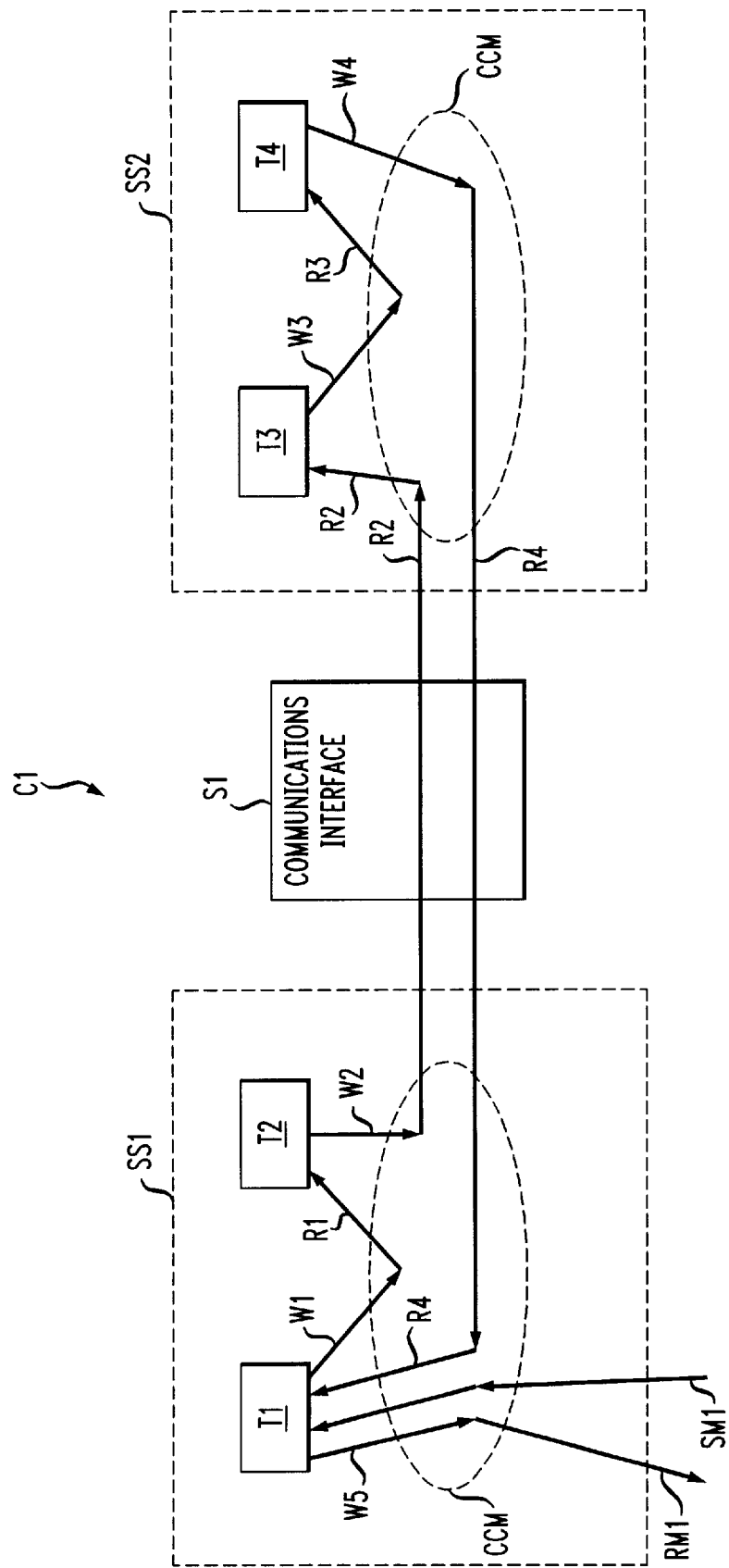
FIG. 1 depicts conventional processor communications when software tasks in a computer subsystem interact with tasks local to, and remote from, the subsystem.

FIG. 1 depicts conventional intra- and inter-subsystem communications between software tasks in a conventional computer system C1 comprising subsystems SS1 and SS2. Tasks T1 and T2 are running on subsystem SS1, and tasks T3 and T4 are running on subsystem SS2. Each subsystem SS1 and SS2 includes a "common communications mechanism," hereinafter "CCM."

The CCM is a conventional internal communications mechanism typically embedded in the operating system ("OS") of each subsystem SS1 and SS2 that facilitates intra- and inter-subsystem communications between the tasks. Alternatively, the CCM can be partially embedded in the OS being a combination of operating system code and application software code. The CCM can be implemented in a variety of ways known in the art.

In a first of such implementations, inter-task communications are supported by the CCM by opening "write" and "receive" channels when requested to do so by the tasks. Such channels allow tasks to send and received messages to and from one another. In more detail, a first task expecting to receive a message during it processing activities makes a request for a receive channel by which it will receive the message. The first task effects such a request by making a "receive-open" subrouting call ("call"), to the CCM. In response, the CCM assigns a queue to the first task. The queue is given a unique handle, or name, within the subsystems SS1 and SS2 comprising computer system C1. The receive-open call typically occurs when the first task initializes, but can occur at any appropriate time. A second task expecting to send a message during its processing activities makes a "write-open" call to the CCM. In the write-open call, the second task specifies a subsystem address and a unique identifier for an intended receiving task, which in this example is the first task. The CCM returns (i.e., provides in response to the call), to the second task, the handle that identifies the queue previously assigned to the first task. Possessing the handle, the second task is able to send a message intended for the first task. Thus, during processing, when the second task has information to send the first task, it invokes a write call, which specifies the handle of the first task plus the information or message buffer to be sent.

In a second of such implementations, inter-task communications are supported by the CCM by opening receive channels when requested to do so. In more detail, a task makes a "receive-open" call to the CCM. In response, the CCM assigns a queue to the calling task. The queue is given a handle by the calling task and that handle is "recorded" by the CCM so that it knows where to enqueue messages addressed to a specific task and handle within the local environment. Upon initialization, or any time during the processing activities of a task, the task can open one or more queues for receiving messages from other tasks, giving each queue a handle that is unique to the task. System designers make such handles known to designers of other tasks in the system. As such, any task can send a message to any other task by making a write call that specifies a processor or subsystem identifier that identifies the processor on which the receiving task runs, an identifier that identifies the receiving task, and the handle used by the receiving task. No write-open call is required in such an implementation.

In the aforedescribed implementations of a CCM, the locations of receiving and writing tasks are not hidden from one another. In other implementations, the location of a receiving task is "hidden" from a sending task.

Figure 2:
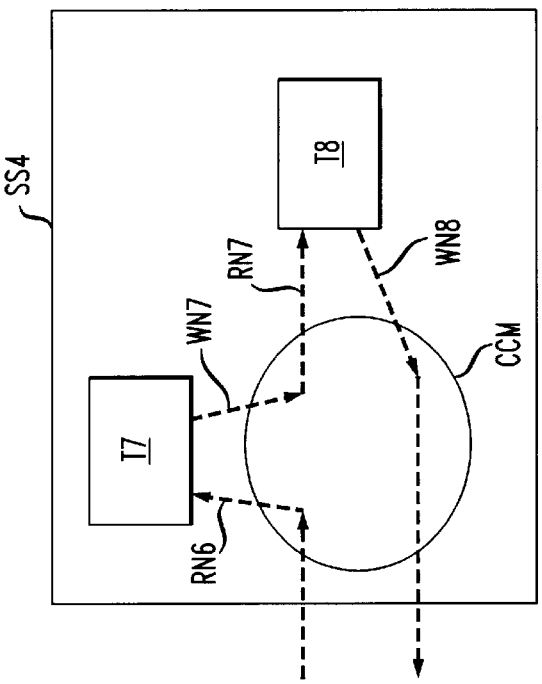
FIG. 2 depicts an apparatus for isolating software for integration testing in accordance with an illustrative embodiment of the present invention.
Figure 2:
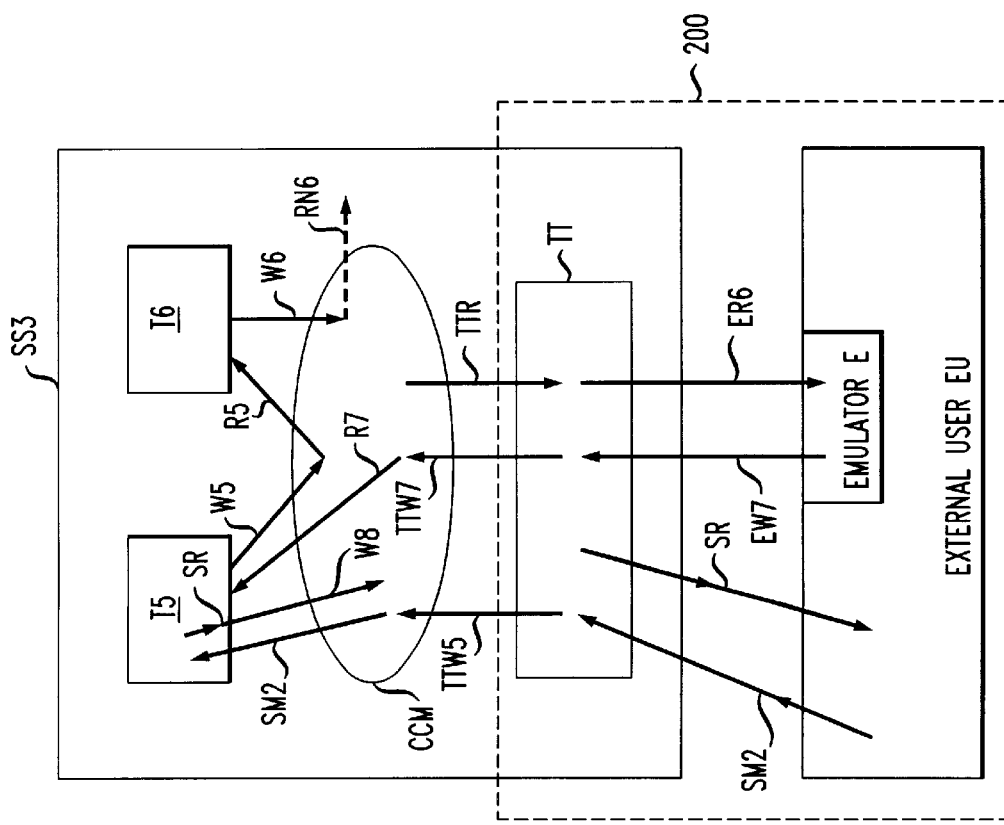

For brevity and clarity, the aforedescribed first implementation of a CCM (i.e., opening receive and write channels) is used for illustrating typical inter-processor communications depicted in FIG. 1, as well to illustrate apparatus 200 for isolating software in accordance with an illustrative embodiment of the present invention depicted in FIG. 2. It should be understood that the second implementation, or other implementations as may occur to those skilled in the art, may suitably be used in conjunction with the present invention.

With reference to FIG. 1, an external stimulus message SM1 is received by subsystem SS1. The real-time executive (not shown) schedules task T1 in computer subsystem SS1 for execution, since it provides the processing required for message SM1. Task T1 begins processing and send information over a write channel W1 via the CCM. Task T2, also in computer subsystem SS1, receives information from task T1 over a receive channel R1 via the CCM. Task T2 send information over write channel W2 to task T3 in subsystem SS2 over receive channel R2. In conjunction with the CCM, a communications interface SI is used to facilitate such interprocessor communication. Communications interface SI comprises a combination of software and hardware, as described later in this Specification.

Task T3 writes to task T4, also in subsystem SS2, over a write channel W3 and receive channel R3. Task T4 sends information over write channel W4 that is received by task T1 in subsystem SS1 over receive channel R4 and communications interface SI. Task T1 completes the required processing with the information received from task T4 and sends a response message RM1 to an external device (e.g., a display monitor, etc.).

Regarding the write and receive channels opened by the various tasks, such channels are, in a first embodiment, opened during the initialization of such tasks. The receive channels remain "up" as long as the associated task is operational in the computer system. In a second embodiment, the tasks open write and receive channels during the course of processing.

As mentioned earlier, communications interface SI comprises a combination of software and hardware. Regarding hardware, communications interface SI provides a physical interconnect that allows communication between subsystems. Examples of such an interface include Ethernet or some other high speed interconnect. There are many standards with accompanying chip sets that enable such communications, such as the IEEE 1394 standard. Another implementation of such an interface is a high speed backplane, such as a VME bus, that is electrically connected to the various processors (i.e., computer subsystems) comprising the computer system. Regardless of the interface, each of such processors is identified by an address that distinguishes it from all other processors in the system.

Regarding the software, the communications interface SI comprises interface drivers that are implemented on all processors. The interface drivers comprise the software necessary for moving a message between processors.

Finally, the CCM in each processor includes tables or the like that enable the CCM to determine that the next destination for a message is over the communications interface SI.

Interprocessor message transfer is accomplished as follows. The CCM presents a message for transfer, as well as the address or handle of the destination (receiving) subsystem, to the sending subsystem's interface driver. The sending subsystem's interface driver passes the message to the interface driver on the receiving subsystem, which in turn passes the message through the local CCM to be placed on a queue that is specified by the received message.

To assure satisfactory operation of the applications software (e.g., tasks T1–T4) running on computer system C1, such software must be "debugged." Debugging refers to a process of identifying and solving any operational problems with the software. As mentioned in the "Background" section of this specification, multi-tasking applications software is usually produced and debugged in "piece-meal" fashion. For example, assume that tasks T1 and T2 are being debugged. In a conventional approach, the software comprising tasks T1 and T2 is altered, such as by adding print statements or by removing statements that cause tasks T1 and T2 to communicate with other tasks, such as T3 and T4, that are not presently being debugged. Such an approach disadvantageously tests application software that is different from the software that will ultimately be running on the final production version of the computer system.

An apparatus 200 for isolating software during integration testing in accordance with an illustrative embodiment of the present invention is depicted in FIG. 2 in conjunction with computer system C2 comprising computer subsystems SS3 and SS4. Computer subsystem SS3 includes software tasks T5 and T6, a CCM, and a test task TT. As depicted in FIG. 2, subsystem SS3 is isolated, in terms of its applications-software communications, from subsystem SS4. Such isolation facilitates testing or debugging the tasks T5 and T6. Unlike conventional approaches, such isolation advantageously allows the testing or debugging operation to be performed on the software intended for the actual production system, rather than on a modified version thereof. While in the illustrative embodiment, subsystem SS3 is isolated from other subsystems, such isolation can be performed to various degrees. In other words, multiple subsystems can be isolated from one or more other subsystems, and one or more tasks within a given subsystem can be isolated from one or more other tasks in the same subsystem. As used herein, the term "local" refers to subsystems and/or tasks under test (i.e., the subsystems or tasks being isolated), and the term "remote" refers to subsystems and/or tasks being emulated.

In accordance with the present teachings, the isolation of tasks is accomplished via apparatus 200 comprising test task TT, which is operable to alter the communications pathways between tasks by invoking capabilities supported by the CCM. In some embodiments, test task TT is included as a part of the multi-tasking operating system provided by the OS vendor. In such embodiments, the vendor provides a set of subroutine calls in the operating system that allow test task TT to alter message routing between tasks. In those embodiments, the test task is described to be "embedded" in the operating system. In other embodiments, test task TT is packaged with the operating system deliverable software provided by the OS vendor, but is not embedded in the operating system.

In still other embodiments, test task TT can be "built" by an applications software developer, and installed into the multi-tasking system as part of the applications software. More particularly, the applications software developer builds and "applications communication library" ("ACL") that "hides" the "native" CCM (provided as part of the OS) from application tasks. The tasks use the ACL to set up channels among the tasks. The ACL interacts with the native CCM to implement the channels. When tasks send and receive messages, they do so through subroutine calls to the ACL. Thus, it is through the ACL that test task TT can alter the aforementioned channels. In such embodiments, test task TT is simply and application task, equivalent to any other application task. Here, test task TT "sits" above the operating system and interacts with it. During debugging, test task TT is used. During the product operational phase, test task TT is simply never used.

Apparatus 200 also includes an external user EU, which may be, for example, a human using a terminal interface, a script generation software program running on processor external to the computer subsystem(s) being tested, or the like. External user EU is operable to emulate the functions of the remote tasks (i.e., tasks T7 and T8 in subsystem SS4). In operation, messages are passed between external user EU and computer system C2. A pathway for such communication can be implemented in a variety of ways including, for example, a communications facility (e.g., a T1 interface), a local area network connection (e.g., Ethernet), a serial port interface (e.g., RS-422 or RS-232), to name a few.

Before describing the illustrative communication pathways depicted in FIG. 2, the operation of apparatus 200 is first described with reference to an illustrative method 300 (FIG. 3) for isolating software for system integration in accordance with the present teachings.

In operation 302 of the illustrative method shown in FIG. 3, a message intended for a remote task is re-routed to an emulator under the control of external user EU. In some embodiments, such rerouting is accomplished by the following steps. First, the computer system receives an externally-originating request for test task TT to interact with the CCM to reroute messages to itself intended for remote tasks or subsystems. In one embodiment, such a request causes test task TT to "set" a "flag" within the CCM. Before sending information to such remote tasks or subsystems as may be required, the CCM tests the flag. If the flag has been set, then the CCM reroutes the information intended for the remote tasks/subsystems to test task TT and then to external user EU. In another embodiment, routing tables maintained by the CCM are changed via an interaction between test task TT and the CCM. Further description of operation 302 is provided later in this specification.

In the illustrated embodiment, the rerouting to external user EU is accomplished as follows: test task TT (i) opens a local receive channel TTR, and (ii) requests that the CCM route all messages intended for remote tasks or subsystems to its local receive channel TTR. Such messages are routed from the local receive channel of test task TT to external user EU, wherein the functionality of such remote tasks/subsystems are emulated, as indicated in operation 304. A response message results.

Finally, in operation 306, the response message is routed by test task TT to the appropriate locally-isolated task. In the illustrated embodiment depicted in FIG. 2, the response message is sent from external user EU to test task TT, and from test task TT to the appropriate local task. In the illustrative embodiment, test task TT accomplishes such routing by opening write channels to all local tasks that ordinarily receive message from other subsystems in computer system C2.

Having described illustrative apparatus 200 and illustrative method 300, the illustrative communications pathways depicted in FIG. 2 are now described. External stimulus message SM2 is sent from external user EU to test task TT, which directs that message, over write channel TTWS, to the CCM and to task T5. To process message SM2, task T5 sends information over write channel W5 and receive channel R5 to task T6. To continue processing, task T6 sends information over write channel W6. The information sent over write channel W6 is, during normal operation, routed to task T7 in SS4 via receive channel RN6 and a communications interface (not shown). Moreover, task T7 normally writes, via WN7 and RN7, to task T8, which, after processing, sends a message back to the CCM in SS3 via WN8 for receipt by T5. During the testing or debugging in accordance with the present teachings, the message delivered via write channel W6 is not routed to task T7, but rather to test task TT via its local receive channel TTR.

The message received by test task TT over channel TTR is then routed, via path ER6, to emulator E, which is under the control of external user EU. Emulator E analyzes the message and emulates, as necessary, remote software tasks, such as tasks T7 and T8. Emulator E can be coded to emulate only those tasks interacting with the tasks being tested, or, alternatively, coded to emulate all tasks. Such emulation is performed via known methods. External user EU generates a response message (from emulation) that is sent to test task TT over EW7. The response message is then sent from test task TT, via a local write channel TTW7, to the CCM. Task T5 receives the emulated response message over receive channel R7. After task T5 completes its processing, it sends a stimulus response SR to the CCM over write channel W8, and then to test task TT via local receive channel TTR. Test task TT then routes stimulus response SR to external user EU.

In this manner, local tasks (i.e., applications software) are isolated from remote tasks for testing without any changes being made to the software being tested. Thus, advantageously, the actual software for use in the final production system, rather than some modification thereof, is debugged. Such an approach should reduce the incidence of problems with the software running in the final production system.

Operation 302 of illustrative method 300 (i.e., rerouting of messages) was previously briefly described. Operation 302 is now described in greater detail. The implementation of operation 302 varies as a function of the isolation scenario. For example, in a first scenario, all tasks running on one subsystem are isolated from the tasks on any other subsystem. In a first embodiment, operation 302 is implemented as follows to provide the isolation desired for the first scenario.

The first embodiment requires a single flag, and memory for storing a "queue handle" for use by the CCM. The applications communication library includes a call that enables the flag to be set ("flag-setting call") and a queue handle stored in memory allocated for such purpose. Test task TT uses the typical CCM facilities (as previously described) to create a queue for it to receive messages. Test task TT then invokes the flag-setting call to set the flag and provides its own queue handle to the CCM. Whenever a message is to be sent by the CCM to the local subsystem interface driver for transmission to a remote subsystem, the CCM tests the flag, and, if the flag is set, it enqueues messages to the test task queue (the handle of which was previously provided to the CCM) instead of passing the message over the interconnect to a remote subsystem. If the flag is not set, the message is sent in the "normal" manner to a remote subsystem. In this manner, test task TT isolates all tasks within a given subsystem from the tasks running on any other subsystem. Other implementations for operation 302 as may suitably occur to those skilled in the art can be used to reroute messages to provide the desired isolation.

In a second scenario, the tasks on any of a number of subsystems comprising a multi-tasking system are isolated, even though test task TT is only located on one specific subsystem because it is the only subsystem having an appropriate interface to external user EU. Such a scenario can be implemented as described above with the modifications described below.

Assuming that test task TT is installed on a first remote subsystem, the modifications comprise installing an "instance" of a helper test task HTT on each of the other subsystems. Under the direction of external user EU, test task TT used the standard CCM capabilities to send a first message to helper test task HTT on the one or more subsystems being isolated. The queue handle for the receive queue of test task TT is passed to helper test task HTT in the first message. Helper test task HTT makes a flag-setting call to its local CCM to set, in its local environment, a flag. Moreover, helper test task HTT provides the CCM with the queue handle of test task TT. As for the first scenario, when a local task directs its local CCM to send a message to a remote subsystem, the local CCM tests the flag. If the flag is set, it enqueues messages to the test task queue (the handle of which was provided to the CCM by helper test task HTT) instead of passing the message over the interconnect to a remote subsystem.

In some embodiments, the CCM uses unique handles that identify a specific subsystem, task and queue, so that the handle is all that is required to be passed in the flag/queue-setting call to the CCM. In other embodiments, a destination subsystem identifier and a task identifier must be passed in addition to the handle, and those identifiers would identify test task TT and the subsystem on which it executes.

In a third scenario, a single task in a subsystem is isolated from all other tasks in the subsystem To implement such a scenario, any message sent from the isolated task is routed to test task TT. In one embodiment suitable for providing the isolation required for this scenario, a flag, and memory for an associated queue handle (and, as required, destination subsystem and task identifiers) must be maintained by the CCM for each task in the isolated subsystem. The CCM provides a call that enables test task TT or helper test task HTT to set and reset such parameters.

To isolate a specific task, test task TT or helper test task HTT invokes the local CCM call to set the above-described parameters for the isolated task. As part of the write call used by one task to send a message to another task, the CCM checks the flag associated with a currently running task to determine if the message being written should be routed to test task TT according to the associated handle parameter. A second CCM call allows test task TT or helper test task HTT to restore the isolated task to its normal mode of operation.

With minor modification, the embodiment described above to implement the third isolation scenario can also be used for isolating any number of tasks on a given subsystem. In particular, test task TT or helper test task HTT make successive calls to set the re-routing for a group of tasks to be isolated. To allow communication between tasks in the group to continue in a standard operational manner, the CCM must maintain additional information for each task. Specifically, a list of exception tasks must be maintained. If the flag for a task is set (such that messages would otherwise be sent to the test task TT queue) and the associated exception list is not empty, the CCM alters its operation from that described in the above scenarios by checking the exception list. If the message being sent by the task is intended for a task in the exception list, then the message is sent as usual to that task. If the message is not intended for an excepted task, then it is routed to test task TT in accordance with the handle.

With additional modification, multiple tasks in multiple subsystems can be isolated for testing. Such modification includes providing the exception list with a subsystem identifier for each excepted task.

As an alternative to the flag testing methodology described in the above embodiments, the CCM keeps a table of addresses that translates a queue handle to a processor identifier, task identifier and queue name. In such a case, routing is changed by changing the addresses (i.e., the translation) kept in the table maintained by the CCM. The previous translation is copied to a "save" area or a secondary translation memory address, so that the original translation can be restored when the debugging operation is ended. Thus, no flags are tested and, as a result, the CCM operates more efficiently.

The differences in the foregoing implementations notwithstanding, rerouting is accomplished by substituting one set of routing information for another. A variety of such substitution methods have been described herein. Other methods suitable for such substitution as may occur to those skilled in the art may be used as an alternative to the above-described methods. Moreover, it may be desirable to test application software under isolation scenarios other than those described above. The principles presented above by which an instrumentality is constructed that allows the CCM to substitute routing information and thereby change message routing can be applied to provide the isolation desired in such other scenarios.

In the application of the aforementioned principles, it is important not to introduce to much "overhead" in the CCM for checking the various flags and task lists. Excessive overhead can degrade CCM performance to an undesirable level. The processing required to implement the embodiments described above will have a negligible affect on CCM performance for most applications.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

I claim:

1. In a multi-tasking computer system, a method for isolating a first software task from other software tasks, comprising the steps of:
   rerouting a message from the first software task that is intended for one of the other software tasks to an external user operable to emulate the one other software task wherein, rerouting comprises:
   requesting that a test task interact with a common communications mechanism; and
   substituting a second set of routing information for a first set of routing information; and
   emulating the one other software task and generating a response message.

2. The method of claim 1, and further comprising the step of:
   sending the response message to the first software task.

3. The method of claim 2, wherein the step of rerouting further comprises the steps of:
   rerouting the message intended for the one other software task to the test task; and
   delivering the rerouted message from the test task to the external user.

4. The method of claim 3, wherein the step of sending further comprises the steps of:
   sending the response message to the test task; and
   routing the response message from the test task to the first software task.

5. The method of claim 1, wherein the step of rerouting further comprises setting a flag, wherein, when the flag is set, the message intended for the one other software task is sent to the test task.

6. The method of claim 1, wherein the step of rerouting further comprises changing a translation maintained in a table by the common communications mechanism.

7. The method of claim 1, wherein the step of rerouting further comprises opening a receive channel to the test task, wherein the message intended for the one other software task is routed to the receive channel.

8. The method of claim 1, wherein the multi-tasking computer system comprises at least first and second computer subsystems, and further wherein the first software task is running on the first computer subsystem and the one other task is running on the second computer subsystem.

9. The method of claim 8, wherein a second software task is running on the first computer subsystem, and further wherein the first and second software tasks are operable to send and receive messages to one another through the common communications system without such messages being rerouted to the test task.

10. An improved computer system of the type having a first processor running a first multi-tasking software including a first group of software tasks and a second processor running a second multi-tasking software including a second group of software tasks, the computer system having an operating system including a common communications mechanism for providing communications paths by which messages are exchanged among software tasks within the groups and between the groups, wherein the improvement comprises:
   a test task operable to alter the communications paths wherein, when altered, one or more software tasks from the first group are isolated from remote software tasks including tasks selected from the group consisting of one or more software tasks of the first group, one or more software tasks of the second group, and one or more software tasks from the first and second groups; and
   an external user comprising an emulator for emulating the one or more remote software tasks.

11. The improved computer system of claim 10, wherein the test task is resident in the operating system.

12. The improved computer system of claim 10, wherein the test task is resident in the application software.

13. The improved computer system of claim 10, wherein the test task further comprises a receive channel that receives information intended for remote tasks.

14. The improved computer system of claim 13, wherein the test task further is operable to deliver information to at least one isolated task.

15. An apparatus for debugging multi-tasking software, comprising:

a first process running a first multi-tasking software comprising a first task capable of performing a first function and a second task capable of performing a second function, wherein, the second task requires a first message from the first task to perform its second function;

a common communications mechanism for delivering the first message from the first task to the second task via a first communication pathway, for delivering a second message via a second communication pathway from the second task to a third task capable of performing a third function, and for delivering a third message via a third communication pathway from the third task to the first task;

a test task operable to alter the second and third communications pathways by forming, in conjunction with the common communications mechanism, respective fourth and fifth communication pathways such that the second message is not delivered to the third task and the third message is not sent from the third task; and an emulator for emulating the third function, wherein, the emulator receives the second message from the second task via the fourth communication pathway and, using the second message, emulates the third function generating a first response message that is equivalent to the third message, and further wherein the first response message is delivered to the first task via the fifth communication pathway.

16. The apparatus of claim 15, wherein the apparatus comprises a second processor running a second multi-tasking software, wherein the second multi-tasking software comprises the third task.

17. The apparatus of claim 15, further comprising:

means for storing routing information; and means for changing routing information, wherein, in conjunction with the test task and the common communications mechanism, said means are collectively operable to establish the fourth and fifth communication pathways.

18. The apparatus of claim 17, wherein the said means, in conjunction with the test task and the common communications mechanism, are collectively operable to re-establish the second and third communication pathways.

* * * * *